March 10, 1925.
H. K. BROWN
CLOSURE
Original Filed Nov. 23, 1921.
1,529,390
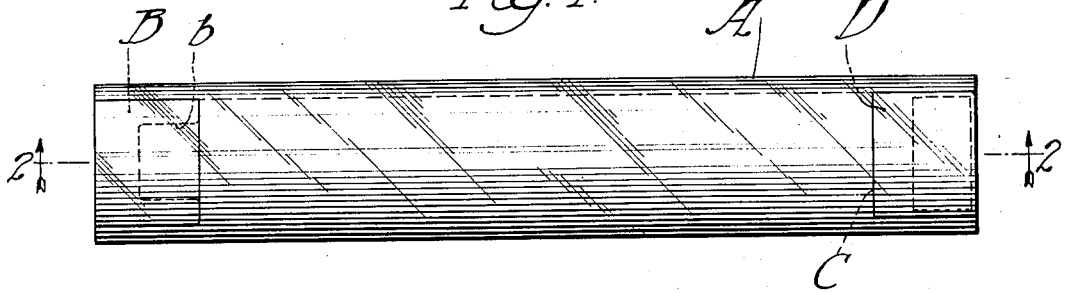
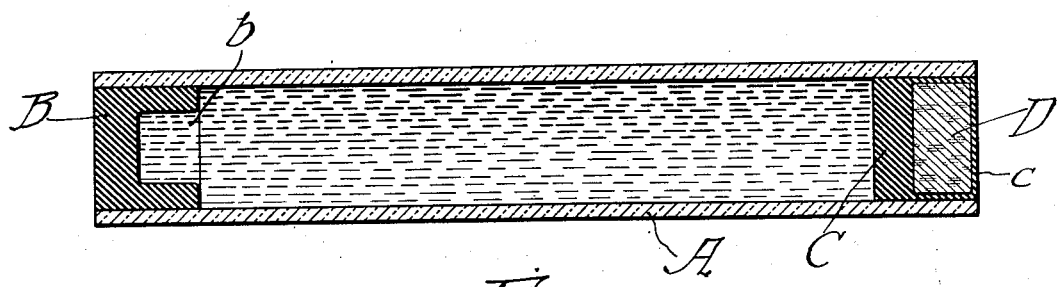
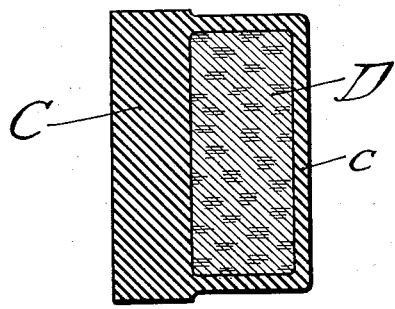
Inventor
Henry K. Brown Patented Mar. 10, 1925.

1,529,390

UNITED STATES PATENT OFFICE.

HENRY KINSEY BROWN, OF CHICAGO, ILLINOIS, ASSIGNOR TO COOK LABORATORIES, INC., A CORPORATION OF DELAWARE.

CLOSURE.

Application filed November 23, 1921, Serial No. 517,316. Renewed October 24, 1924.

*To all whom it may concern:*

Be it known that I, HENRY KINSEY BROWN, a citizen of the United States, residing at Chicago, in the county of Cook and State of Illinois, have invented new and useful Improvements in Closures, of which the following is a full, clear, and exact description.

This invention relates to closures for ampules, and aims to provide a sealing closure which is not attacked by medicaments and is economical to manufacture. The invention may be understood by reference to the illustrative embodiment shown in the accompanying drawings, in which:

Figure 1 is an enlarged side elevation of a container with which the improved closure is used.

Figure 2 is a longitudinal section on dotted line 2, 2, Figure 1.

Figure 3 is a magnified longitudinal central section of said closure.

Closures or plugs heretofore made for ampules and the like have been either wholly of cork or wholly of rubber. A disadvantage of a cork closure is that it is readily attacked by certain medicaments, for example morphine; while the rubber closures are expensive. The invention provides a closure composed of a section of rubber permanently united to a section of cork; the resultant closure being inexpensive and neutral toward medicaments which will destroy cork.

It is to be understood that the illustrative forms shown in the drawings are simply preferred embodiments of the invention; and that in the following explanation of those forms the described details of structure and organization are merely exemplary.

The ampule comprises a glass tube A sealed at opposite ends by closures or plugs. The plug B, preferably of rubber, has a central recess *b* to reduce its axial thickness, which facilitates piercing by a canula (not shown) provided to conduct the medicament out of the ampule when the plunger plug is pushed.

The plunger plug is of composite construction, consisting of a solid rubber section C united to a solid cork section D, the rubber section having a slightly greater diameter. In the form shown in Fig. 3, a thin rubber film *c* integral with the rubber section C completely envelopes the cork section. The plug of Fig. 3 is best made in a mold.

Obviously the present invention is not restricted to the particular embodiment thereof herein shown and described.

What I claim as new is:

1. A closure comprising a rubber body solid adjacent one face thereof, and having an integral film covering a filler body of elastic but inexpensive material.

2. A closure comprising a section of cork, and a section of rubber, said section of rubber having integral therewith a film of rubber which envelopes said cork section.

3. A closure comprising a section of cork, and a section of rubber slightly greater in diameter than the cork section, the rubber section having an attached film which envelopes the cork section.

In witness whereof I have hereunto set my hand and seal this 8th day of November, 1921.

HENRY KINSEY BROWN.

Witnesses:
VIOLET WARDELL,
FRANK D. THOMASON.